United States Patent
Roziere (10) Patent No.: US 10,303,266 B2
(45) Date of Patent: May 28, 2019

(54) THREE-DIMENSIONAL MAN/MACHINE INTERFACE

(75) Inventor: Didier Roziere, Nimes (FR)

(73) Assignee: Quickstep Technologies LLC, Wilmington, DE (US)

( * ) Notice: Subject to any disclaimer, the term of this patent is extended or adjusted under 35 U.S.C. 154(b) by 0 days.

(21) Appl. No.: 13/982,791

(22) PCT Filed: Jan. 30, 2012

(86) PCT No.: PCT/FR2012/050183
§ 371 (c)(1),
(2), (4) Date: Jul. 31, 2013

(87) PCT Pub. No.: WO2012/104529
PCT Pub. Date: Aug. 9, 2012

(65) Prior Publication Data
US 2013/0307776 A1   Nov. 21, 2013

(30) Foreign Application Priority Data
Jan. 31, 2011 (FR) ..................... 11 50726

(51) Int. Cl.
*G06F 3/0488* (2013.01)
*G06F 3/0486* (2013.01)
(Continued)

(52) U.S. Cl.
CPC ............ *G06F 3/033* (2013.01); *G06F 3/0482* (2013.01); *G06F 3/0486* (2013.01);
(Continued)

(58) Field of Classification Search
CPC ............ G06F 3/04842; G06F 3/04812; G06F 3/0481; G06F 3/038; G06F 17/30961;
(Continued)

(56) References Cited

U.S. PATENT DOCUMENTS 5,103,085 A   4/1992   Zimmerman
5,270,818 A   12/1993  Ottenstein
(Continued)

FOREIGN PATENT DOCUMENTS

CA   1243096 A   10/1988
CN   101547253 A   9/2009
(Continued)

OTHER PUBLICATIONS

International Search Report dated May 9, 2014, for PCT Application PCT/EP2014/052533, three pages.
(Continued)

*Primary Examiner* — Mihir K Rayan
(74) *Attorney, Agent, or Firm* — Morrison & Foerster LLP (57) ABSTRACT

A method is provided for selecting controls, which implements a control interface, a display, and at least one sensor capable of detecting at least one control object, including a step (i) of obtaining information on the distance between the control object(s) and the control interface using the sensor (s), and a step (ii) of displaying, on the display, at least one symbol representing a control or set of controls according to a display mode, wherein the method further includes a step of using the distance information to determine the display mode of the symbol(s). A device is also provided for implementing the method and to an apparatus.

51 Claims, 4 Drawing Sheets

(51) Int. Cl.
*G06F 3/0482* (2013.01)
*G06F 3/033* (2013.01)

(52) U.S. Cl.
CPC ........ *G06F 3/0488* (2013.01); *G06F 3/04883* (2013.01); *G06F 2203/04101* (2013.01)

(58) Field of Classification Search
CPC .. G06F 9/443; G06F 3/0489; G06F 17/30994; H04L 41/22
See application file for complete search history.

(56) References Cited

U.S. PATENT DOCUMENTS

| | | | |
|---|---|---|---|
| 5,345,550 A * | 9/1994 | Bloomfield | B23B 41/04 144/162.1 |
| 5,347,295 A | 9/1994 | Agulnick et al. | |
| 5,363,051 A | 11/1994 | Jenstrom et al. | |
| 5,406,305 A | 4/1995 | Shimomura et al. | |
| 5,483,261 A | 1/1996 | Yasutake | |
| 5,488,204 A | 1/1996 | Mead et al. | |
| 5,528,266 A | 6/1996 | Arbeitman et al. | |
| 5,684,294 A | 11/1997 | Kouhi | |
| 5,825,352 A | 10/1998 | Bisset et al. | |
| 5,835,079 A | 11/1998 | Shieh | |
| 5,844,506 A | 12/1998 | Binstead | |
| 5,880,411 A | 3/1999 | Gillespie et al. | |
| 5,952,992 A | 9/1999 | Helms | |
| 5,956,291 A | 9/1999 | Nehemiah et al. | |
| 6,073,036 A | 6/2000 | Heikkinen et al. | |
| 6,105,419 A | 8/2000 | Michels et al. | |
| 6,188,391 B1 | 2/2001 | Seely et al. | |
| 6,253,218 B1 * | 6/2001 | Aoki | G06F 17/30126 707/999.007 |
| 6,308,144 B1 | 10/2001 | Bronfield et al. | |
| 6,310,610 B1 | 10/2001 | Beaton et al. | |
| 6,313,853 B1 | 11/2001 | Lamontagne et al. | |
| 6,323,846 B1 | 11/2001 | Westerman et al. | |
| 6,373,612 B1 | 4/2002 | Hoffman et al. | |
| 6,414,674 B1 | 7/2002 | Kamper et al. | |
| 6,480,188 B1 | 11/2002 | Horsley | |
| 6,520,013 B1 | 2/2003 | Wehrenberq | |
| 6,583,676 B2 | 6/2003 | Krah et al. | |
| 6,601,012 B1 | 7/2003 | Horvitz et al. | |
| 6,661,920 B1 | 12/2003 | Skinner | |
| 6,664,744 B2 | 12/2003 | Dietz | |
| 6,680,677 B1 | 1/2004 | Tiphane | |
| 6,690,275 B2 | 2/2004 | Long et al. | |
| 6,690,387 B2 | 2/2004 | Zimmerman et al. | |
| 6,812,466 B2 | 11/2004 | O'Connor et al. | |
| 6,822,635 B2 | 11/2004 | Shahoian et al. | |
| 6,847,354 B2 | 1/2005 | Vranish | |
| 6,903,730 B2 | 6/2005 | Mathews et al. | |
| 6,920,619 B1 | 7/2005 | Milekic | |
| 6,947,571 B1 | 9/2005 | Rhoads et al. | |
| 6,956,564 B1 | 10/2005 | Williams | |
| 6,961,912 B2 | 11/2005 | Aoki et al. | |
| 7,015,894 B2 | 3/2006 | Morohoshi | |
| 7,016,705 B2 | 3/2006 | Bahl et al. | |
| 7,019,622 B2 | 3/2006 | Orr et al. | |
| 7,058,902 B2 | 6/2006 | Iwema et al. | |
| 7,151,528 B2 | 12/2006 | Taylor et al. | |
| 7,171,221 B1 | 1/2007 | Amin et al. | |
| 7,184,064 B2 | 2/2007 | Zimmerman et al. | |
| 7,319,454 B2 | 1/2008 | Thacker et al. | |
| 7,522,065 B2 | 4/2009 | Falcon | |
| RE40,867 E | 8/2009 | Binstead | |
| 7,570,064 B2 | 8/2009 | Roziere | |
| 7,593,552 B2 | 9/2009 | Higaki | |
| 7,633,076 B2 | 12/2009 | Huppi et al. | |
| 7,653,883 B2 | 1/2010 | Hotelling et al. | |
| 7,663,607 B2 | 2/2010 | Hotelling et al. | |
| 7,663,620 B2 * | 2/2010 | Robertson | G06T 15/503 345/419 |
| 7,743,348 B2 | 6/2010 | Robbins et al. | |
| 8,149,002 B2 | 4/2012 | Ossart et al. | |
| 8,159,213 B2 | 4/2012 | Roziere | |
| 8,381,135 B2 | 2/2013 | Hotelling et al. | |
| 8,479,122 B2 | 7/2013 | Hotelling et al. | |
| 8,612,856 B2 | 12/2013 | Hotelling et al. | |
| 8,770,033 B2 | 7/2014 | Roziere | |
| 8,917,256 B2 | 12/2014 | Roziere | |
| 9,035,903 B2 | 5/2015 | Binstead | |
| 2001/0015718 A1 | 8/2001 | Hinckley et al. | |
| 2001/0031633 A1 | 10/2001 | Tuomela et al. | |
| 2001/0035858 A1 | 11/2001 | Blumberg | |
| 2002/0057260 A1 | 5/2002 | Mathews et al. | |
| 2002/0140633 A1 | 10/2002 | Rafii et al. | |
| 2002/0167488 A1 | 11/2002 | Hinckley et al. | |
| 2003/0001899 A1 | 1/2003 | Partanen et al. | |
| 2003/0016253 A1 | 1/2003 | Aoki et al. | |
| 2003/0076363 A1 | 4/2003 | Murphy | |
| 2003/0095096 A1 | 5/2003 | Robbin et al. | |
| 2003/0132922 A1 | 7/2003 | Philipp | |
| 2003/0160808 A1 | 8/2003 | Foote et al. | |
| 2003/0179201 A1 | 9/2003 | Thacker | |
| 2004/0145601 A1 | 7/2004 | Brielmann et al. | |
| 2004/0150668 A1 | 8/2004 | Myers et al. | |
| 2004/0150669 A1 | 8/2004 | Sabiers et al. | |
| 2004/0224638 A1 | 11/2004 | Fadell et al. | |
| 2004/0233153 A1 | 11/2004 | Robinson | |
| 2004/0245438 A1 | 12/2004 | Payne et al. | |
| 2005/0015731 A1 | 1/2005 | Mak et al. | |
| 2005/0057524 A1 | 3/2005 | Hill et al. | |
| 2005/0134578 A1 | 6/2005 | Chambers et al. | |
| 2005/0190142 A1 | 9/2005 | Ferguson | |
| 2005/0219223 A1 | 10/2005 | Kotzin et al. | |
| 2005/0219228 A1 | 10/2005 | Alameh et al. | |
| 2005/0219394 A1 | 10/2005 | Du et al. | |
| 2005/0221791 A1 | 10/2005 | Angelhag | |
| 2005/0223308 A1 | 10/2005 | Gunn et al. | |
| 2006/0001650 A1 * | 1/2006 | Robbins | G06F 3/0421 345/173 |
| 2006/0010400 A1 | 1/2006 | Dehlin et al. | |
| 2006/0012577 A1 | 1/2006 | Kyrola | |
| 2006/0017692 A1 | 1/2006 | Wehrenberq et al. | |
| 2006/0026521 A1 | 2/2006 | Hotelling et al. | |
| 2006/0026535 A1 | 2/2006 | Hotellinq | |
| 2006/0097733 A1 | 5/2006 | Roziere | |
| 2006/0117108 A1 | 6/2006 | Salisbury et al. | |
| 2006/0146012 A1 | 7/2006 | Arneson et al. | |
| 2006/0161870 A1 | 7/2006 | Hotelling et al. | |
| 2006/0161871 A1 | 7/2006 | Hotelling et al. | |
| 2006/0164241 A1 | 7/2006 | Makela et al. | |
| 2006/0197753 A1 | 9/2006 | Hotelling | |
| 2006/0244735 A1 | 11/2006 | Wilson | |
| 2006/0279548 A1 * | 12/2006 | Geaghan | G06F 3/0416 345/173 |
| 2006/0290921 A1 | 12/2006 | Hotelling et al. | |
| 2007/0075965 A1 | 4/2007 | Huppi et al. | |
| 2007/0085157 A1 | 4/2007 | Fadell et al. | |
| 2007/0099574 A1 | 5/2007 | Wang | |
| 2007/0216659 A1 | 9/2007 | Amineh | |
| 2007/0277123 A1 * | 11/2007 | Shin et al. | 715/863 |
| 2008/0006762 A1 | 1/2008 | Fadell et al. | |
| 2008/0090617 A1 | 4/2008 | Sutardia | |
| 2008/0113618 A1 | 5/2008 | De Leon et al. | |
| 2008/0278450 A1 | 11/2008 | Lashina | |
| 2008/0284261 A1 | 11/2008 | Andrieux et al. | |
| 2008/0307345 A1 * | 12/2008 | Hart | G06F 11/1448 715/769 |
| 2008/0307360 A1 | 12/2008 | Chaudhri et al. | |
| 2008/0309632 A1 * | 12/2008 | Westerman | G06F 3/038 345/173 |
| 2009/0128498 A1 | 5/2009 | Hollemans et al. | |
| 2009/0265670 A1 * | 10/2009 | Kim | G06F 3/04883 715/863 |
| 2009/0289914 A1 | 11/2009 | Cho | |
| 2009/0295715 A1 | 12/2009 | Seo et al. | |
| 2009/0315858 A1 * | 12/2009 | Sato | G06F 3/044 345/174 |
| 2009/0327969 A1 * | 12/2009 | Estrada | G06F 3/04815 715/848 |
| 2010/0052700 A1 | 3/2010 | Yano et al. | |

(56) References Cited

U.S. PATENT DOCUMENTS

| | | | |
|---|---|---|---|
| 2010/0060599 A1* | 3/2010 | Kwak | G06F 3/0488 345/173 |
| 2010/0123667 A1* | 5/2010 | Kim | G06F 3/044 345/173 |
| 2010/0211919 A1* | 8/2010 | Brown | G06F 3/04817 715/863 |
| 2010/0265204 A1* | 10/2010 | Tsuda | 345/174 |
| 2011/0041096 A1* | 2/2011 | Larco | G06F 3/0482 715/835 |
| 2011/0128244 A1* | 6/2011 | Cho | G06F 1/1626 345/173 |
| 2011/0164063 A1 | 7/2011 | Shimotani et al. | |
| 2011/0169783 A1 | 7/2011 | Wang et al. | |
| 2011/0179368 A1* | 7/2011 | King | G06F 3/04815 715/769 |
| 2011/0221776 A1 | 9/2011 | Shimotani et al. | |
| 2011/0248963 A1* | 10/2011 | Lawrence et al. | 345/175 |
| 2011/0296351 A1* | 12/2011 | Ewing, Jr. | G06F 3/0346 715/841 |
| 2012/0026113 A1 | 2/2012 | Kasahara et al. | |
| 2012/0044662 A1 | 2/2012 | Kim et al. | |
| 2012/0187965 A1 | 7/2012 | Roziere | |
| 2012/0188200 A1 | 7/2012 | Roziere | |
| 2012/0270533 A1 | 10/2012 | You | |
| 2013/0135247 A1 | 5/2013 | Na et al. | |
| 2014/0074426 A1 | 3/2014 | Hotelling | |
| 2014/0132335 A1 | 5/2014 | Rauhala et al. | |
| 2015/0035792 A1 | 2/2015 | Roziere et al. | |
| 2016/0004348 A1* | 1/2016 | Roziere | G06F 3/041 345/174 |
| 2016/0179247 A1 | 6/2016 | Blondin | |

FOREIGN PATENT DOCUMENTS

| | | |
|---|---|---|
| DE | 10042300 A1 | 3/2002 |
| DE | 10059906 A1 | 6/2002 |
| DE | 10251296 A1 | 5/2004 |
| EP | 0 462 759 A2 | 12/1991 |
| EP | 0 464 908 A2 | 1/1992 |
| EP | 0 288 692 B1 | 7/1993 |
| EP | 0 664 504 A2 | 7/1995 |
| EP | 0 992 969 A1 | 4/2000 |
| EP | 1 014 295 A3 | 1/2002 |
| EP | 1 185 058 A2 | 3/2002 |
| EP | 1 335 430 A1 | 8/2003 |
| EP | 1 355 223 A2 | 10/2003 |
| EP | 1 452 988 A1 | 9/2004 |
| EP | 1 507 132 A1 | 2/2005 |
| EP | 1 507 196 A2 | 2/2005 |
| EP | 1 569 079 A1 | 8/2005 |
| EP | 1 696 414 A1 | 8/2006 |
| EP | 2 104 024 A1 | 9/2009 |
| EP | 2 105 844 A2 | 9/2009 |
| EP | 2 166 463 A1 | 3/2010 |
| EP | 2 267 791 A2 | 10/2010 |
| EP | 2 426 581 A2 | 3/2012 |
| EP | 2 634 687 A2 | 9/2013 |
| GB | 2330670 A | 4/1999 |
| GB | 2418808 A | 4/2006 |
| JP | 63-167923 A | 7/1988 |
| JP | 06-161661 A | 6/1994 |
| JP | 2000-163031 A | 6/2000 |
| JP | 2002-342033 A | 11/2002 |
| KR | 2011-0029681 A1 | 3/2011 |
| WO | WO-97/18547 A1 | 5/1997 |
| WO | WO-97/23738 A1 | 7/1997 |
| WO | WO-98/14863 A2 | 4/1998 |
| WO | WO-99/28813 A1 | 6/1999 |
| WO | WO-00/38042 A1 | 6/2000 |
| WO | WO-2004/093045 A1 | 10/2004 |
| WO | WO-2006/003590 | 1/2006 |
| WO | WO-2006/023569 A1 | 3/2006 |
| WO | WO-2006/026012 A2 | 3/2006 |
| WO | WO-2009/028892 A2 | 3/2009 |
| WO | WO-2015/007781 A1 | 1/2015 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Sep. 28, 2016, for U.S. Appl. No. 14/767,238, filed Aug. 11, 2015, twelve pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Agilent Technologies Inc., "Agilent unveils optical proximity sensor for mobile appliances", http://www.embeddedstar.com/press/content/2004/8/embedded16015.html, (Aug. 31, 2004), 2 pages.

Anonymous. (2005). "Gesture Recognition," located at <http://www.fingerworks.com/gesture_recognition.html>, last visited Aug. 30, 2005.

Anonymous. (2005). "Touch Technologies: Touch is Everywhere," located at http://www.3m.com/3MTouchSystems/downloads/PDFs/TouchTechOV.pdf., last visited Aug. 30, 2005.

Anonymous. "4-Wire Resistive Touchscreens" obtained from http://www.touchscreens.com/intro-touchtypes-4resistive.html generated Aug. 5, 2005.

Anonymous. "5-Wire Resistive Touchscreens" obtained from http://www.touchscreens.com/intro-touchtypes-resistive.html, generated Aug. 5, 2005.

Anonymous. "A Brief Overview of Gesture Recognition" obtained from http://www. Dai. Ed. Ac.uk/Cvonline/LOCAL_COPIES/COHEN/gesture_overview. Html, generated Apr. 20, 2004.

Anonymous. "Ai Squared Products—XoomText Magnifier," http://www/aisquared.com/Products/zoomtexturemag/index.cfm, downloaded Oct. 26, 2005.

Anonymous. "Capacitive Position Sensing" obtained from http://www.synaptics.com/technology/cps.cfin generated Aug. 5, 2005.

Anonymous. "Capacitive Touchscreens" obtained from http://www.touchscreens.com/intro- touchtypes-capacitive.html generated Aug. 5, 2005.

Anonymous. "Comparing Touch Technologies" obtained from http://www.touchscreens.com/intro-touchtypes.html generated Oct. 10, 2004.

Anonymous. "FingerWorks—Gesture Guide—Application Switching," obtained from http://www.fingerworks.com/gesture_guide_apps.html, generated on Aug. 27, 2004, 1-pg.

Anonymous. "FingerWorks—Gesture Guide—Editing," obtained from http://www.fingerworks.com/gesure_guide_editing.html, generated on Aug. 27, 2004, 1-pg.

Anonymous. "FingerWorks—Gesture Guide—File Operations," obtained from http://www.fingerworks.com/gesture_guide_files.html, generated on Aug. 27, 2004, 1-pg.

Anonymous. "FingerWorks—Gesture Guide—Text Manipulation," obtained from http://www.fingerworks.com/gesture_guide_text_manip. html, generated on Aug. 27, 2004, 2-pg.

Anonymous. "FingerWorks—Gesture Guide—Tips and Tricks," obtained from http://www.fingerworks.com/gesture_guide_tips.html, generated Aug. 27, 2004, 2-pgs.

Anonymous. "FingerWorks—Gesture Guide—Web," obtained from http://www.fingerworks.com/gesture_guide_web.html, generated on Aug. 27, 2004, 1-pg.

Anonymous. "FingerWorks—Guide to Hand Gestures for USB Touchpads," obtained from http://www.fingerworks.com/igesture_userguide.html, generated Aug. 27, 2004, 1-pg.

(56) References Cited

OTHER PUBLICATIONS

Anonymous. "FingerWorks—iGesture—Technical Details," obtained from http://www.fingerworks.com/igesture_tech.html, generated Aug. 27, 2004, 1-pg.
Anonymous. "FingerWorks13 The Only Touchpads with Ergonomic Full-Hand Resting and Relaxation!" obtained from http://www.fingerworks.com/resting.html, Copyright 2001, 1-pg.
Anonymous. "FingerWorks—Tips for Typing on the Mini," obtained from http://www.fingerworks.com/mini_typing.html, generated on Aug. 27, 2004, 2-pgs.
Anonymous. "GlidePoint®" obtained from http://www.cirque.com/technology/technology_gp.html generated Aug. 5, 2005.
Anonymous. "How do touchscreen monitors know where you're touching?" obtained from http://www.electronics.howstuffworks.com/question716.html generated Aug. 5, 2005.
Anonymous. "How does a touchscreen work?" obtained from http://www.touchscreens.com/intro-anatomy.html generated Aug. 5, 2005.
Anonymous. "iGesture Pad—the MultiFinger USB TouchPad with Whole-Hand Gestures,"obtained from http://www.fingerworks.com/igesture.html, generated Aug. 27, 2004, 2-pgs.
Anonymous. "iGesture Products for Everyone (learn in minutes) Product Overview" FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Lunar Screen Magnifier and Lunar Plus Enhanced Screen Magnifier," www.dolphincomputeraccess.com/products/lunar.htm, downloaded Oct. 25, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Surface Acoustic Wave Touchscreens" obtained from http://www.touchscreens.com/intro-touchtypes-saw.html generated Aug. 5, 2005.
Anonymous. "Symbol Commander" obtained from http://www.sensiva.com/symbolcommander/, generated Aug. 30, 2005.
Anonymous. "Touchscreen Technology Choices," http://www.elotouch.com/products/detech2.asp, downloaded Aug. 5, 2005.
Anonymous. "Visual Disabilities," http://depts.stcc.edu/ods/ACCESS/bpvisual.htm, downloaded Oct. 25, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Bier et al., "Toolglass and Magic Lenses: The see-through interface" In James Kijiya, editor, Computer Graphics (SIGGRAPH '93 Proceedings), vol. 27, pp. 73-80, Aug. 1993.
Chen et al. "Flowfield and Beyond: Applying Pressure-Sensitive Multi-Point Touchpad Interaction," *Multimedia and Expo, 2003, ICME '03, Proceedings*, Jul. 9, 2003, pp. 1-49, 152.
CNET News.com, "Reinventing the Scroll Wheel," Photo 1, downloaded from the Internet at: http://news.com.com/2300-1041_3-6107951-1.html?tag=ne.gall.pg, Aug. 22, 2006, 2 pages.
CNET News.com, "Reinventing the Scroll Wheel," Photo 2, downloaded from the Internet at: http://news.com.com/2300-1041_3-6107951-2.html?tag=ne.gall.pg, Aug. 22, 2006, 2 pages.
CNET News.com, "Reinventing the Scroll Wheel," Photo 3, downloaded from the Internet at: http://news.com.com/2300-1041_3-6107951-3.html?tag=ne.gall.pg, Aug. 22, 2006, 2 pages.
CNET News.com, "Reinventing the Scroll Wheel," Photo 4, downloaded from the Internet at: http://news.com.com/2300-1041_3-6107951-4.html?tag=ne.gall.pg, Aug. 22, 2006, 2 pages.
CNET News.com, "Reinventing the Scroll Wheel," Photo 5, downloaded from the Internet at: http://news.com.com/2300-1041_3-6107951-5.html?tag=ne.gall.pg, Aug. 22, 2006, 2 pages.
CNET News.com, "Reinventing the Scroll Wheel," Photo 6, downloaded from the Internet at: http://news.com.com/2300-1041_3-6107951-6.html?tag=ne.gall.pg, Aug. 22, 2006, 2 pages.
CNET News.com, "Reinventing the Scroll Wheel," Photo 7, downloaded from the Internet at: http://news.com.com/2300-1041_3-6107951-7.html?tag=ne.gall.pg, Aug. 22, 2006, 2 pages.
CNET News.com, "Reinventing the Scroll Wheel," Photo 8, downloaded from the Internet at: http://news.com.com/2300-1041_3-6107951-8.html?tag=ne.gall.pg, Aug. 22, 2006, 2 pages.
Douglas et al., *The Ergonomics of Computer Pointing Devices* (1997).
EVB Elektronik "TSOP6238 IR Receiver Modules for Infrared Remote Control Systems" dated Jan. 2004 1-pg.
Final Office Action dated Mar. 17, 2017, for U.S. Appl. No. 14/767,238, filed Aug. 11, 2015, 15 pages.
Fisher et al., "Repetitive Motion Disorders: The Design of Optimal Rate—Rest Profiles," Human Factors, 35(2):283-304 (Jun. 1993).
Fukumoto and Yoshinobu Tonomura, "Body Coupled Fingering: Wireless Wearable Keyboard," *CHI97*, pp. 147-154 (Mar. 1997).
Fukumoto et al., "Active Click: Tactile Feedback for Touch Panels," In CHI 2001 Summary, pp. 121-122, 2001.
Hardy, "Fingerworks" Mar. 7, 2002; BBC World on Line.
Hillier and Gerald J. Lieberman, *Introduction to Operations Research* (1986).
Hinckley et al. "Touch-Sensing Input Devices," In CHI '99 Proceedings, pp. 223-230, 1999.
Jacob et al., "Integrality and Separability of Input Devices," *ACM Transactions on Computer-Human Interaction*, 1:3-26 (Mar. 1994).
Kahney, L. (Mar. 8, 2004). "Pocket PCs Masquerade as IPods," available at: http://www.wired.com/gadgets/mac/news/2004/03/62543, last visited on Apr. 28, 2008, two pages.
Kennedy, "Methods and Apparatuses for Configuration Automation", U.S. Appl. No. 10/805,144, 59 pages.
Kionx "KXP84 Series Summary Data Sheet" copyright 2005,dated Oct. 21, 2005, 4-pgs.
Lee, "A Fast Multiple-Touch-Sensitive Input Device," Master's Thesis, University of Toronto (1984).
Matsushita et al., "HoloWall: Designing a Finger, Hand, Body and Object Sensitive Wall," In Proceedings of UIST '97, Oct. 1997.
Quantum Research Group "QT510 / Qwheel$^{TM}$ Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1):130-140 (Mar. 1997).
Rekimoto et al., "ToolStone: Effective Use of the Physical Manipulation Vocabularies of Input Devices," In Proc. of UIST 2000, 2000.
Roos, Gina "Agilent's new proximity sensor beats the fumble-fingered competition hands down . . . literally", eeProductCenter, URL:http://www.eeproductcenter.com/show Article.jhtml?article ID_46200544, (Sep. 1, 2004), 3 pages.
Rubine et al., "Programmable Finger-Tracking Instrument Controllers," *Computer Music Journal*, vol. 14, No. 1 (Spring 1990).
Rutledge et al., "Force-To-Motion Functions for Pointing," Human-Computer Interaction—Interact (1990).
Smith, R. et al. (1996). "Relating Distortion to Performance in Distortion-Oriented Displays," *Proceedings of the 6$^{th}$ Australian Conference on Computer-Human Interaction* (OZCHI '96), pp. 6-11.

(56) References Cited

OTHER PUBLICATIONS

Subatai Ahmad, "A Usable Real-Time 3D Hand Tracker," Proceedings of the 28$^{th}$ Asilomar Conference on Signals, Systems and Computers—Part 2 (of2), vol. 2 (Oct. 1994).

Sun Microsystems. (1992). "The Star7 PDA Prototype," located at <http://www.youtube.com/watch?v=Ahg8OBYixL0, last visited Jan. 15, 2010, seven pages.

Texas Instruments "TSC2003 / I2C Touch Screen Controller" Data Sheet SBAS 162, dated Oct. 2001, 20-pgs.

The Gadgeteer. (Jun. 6, 2003). "Apple iPod (30GB)," available at http://the-gadgeteer.com/review/apple_ipod_30gb_review, last visited Apr. 28, 2008, 19 pages.

Universal Remote Control, Inc., "Operating System with the Aurora MX-950", MX-950 Owners Manual, (2005).

Universal Remote Control, Inc., "All Complete Control Remotes Now Use Narrow Band RF", http://www.universalremote.com/corporate/press release.php?press=13, (2008).

Universal Remote Control, Inc., "MX-950 (The Aurora)", www.unversalremote.com, (2005).

Wellner, "The Digital Desk Calculators: Tangible Manipulation on a Desk Top Display" in ACM UIST '91 Proceedings, pp. 27-34, Nov. 1991.

Williams, "Applications for a Switched-Capacitor Instrumentation Building Block" Linear Technology Application Note 3, Jul. 1985, pp. 1-16.

Yamada et al., "A Switched-Capacitor Interface for Capacitive Pressure Sensors" IEEE Transactions on Instrumentation and Measurement, vol. 41, No. 1, Feb. 1992, pp. 81-86.

Yeh et al., "Switched Capacitor Interface Circuit for Capacitive Transducers" 1985 IEEE.

Zhai et al., "Dual Stream Input for Pointing and Scrolling," *Proceedings of CHI '97 Extended Abstracts* (1997).

Zimmerman et al., "Applying Electric Field Sensing to Human-Computer Interfaces," in CHI '85 Proceedings, pp. 280-287, 1995.

Final Office Action dated Mar. 9, 2018, for U.S. Appl. No. 14/767,238, filed Aug. 11, 2015, 23 pages.

Final Office Action dated Sep. 15, 2017, for U.S. Appl. No. 14/767,238, filed Aug. 11, 2015, 16 pages.

Chinese Search Report dated Apr. 20, 2017, for CN Application No. 201280007164.6, with English translation, four pages.

\* cited by examiner

THREE-DIMENSIONAL MAN/MACHINE INTERFACE

TECHNICAL FIELD

The present invention relates to a method for selecting commands, suitable for implementation in a three-dimensional human-machine interface. It also relates to a device implementing the method.

The field of the invention is more particularly but non-limitatively that of contactless human-machine interfaces.

BACKGROUND

Touch interfaces, or touch screens, are now widely used for controlling appliances as varied as computers, mobile phones, etc.

Generally, they comprise a display screen and sensors making it possible to determine the point(s) of contact between the surface of the screen and one or more command objects such as fingers or a stylus.

These touch interfaces frequently use capacitive measurement technologies for detecting the position of the command objects. The screen can be for example covered with a mesh of capacitive electrodes, and the position of the object is detected based on its interactions, in the form of capacitive couplings, with the electrodes.

Touch interfaces also comprise a software element making it possible to interpret the user commands. The display changes according to the position of the command object(s) detected, allowing the user to monitor his actions visually and to select commands.

Gesture interfaces, or 3D interfaces, are also known in which a third dimension is added with the possibility of detecting objects remotely before they touch the surface of the screen. These interfaces are equipped with sensors making it possible to measure the position in space, with respect to the interface, of one or more command objects.

Capacitive measurement technologies are also well adapted to producing this type of interface.

Document FR 2 844 349 by Rozière is known for example, which discloses a capacitive proximity detector comprising a plurality of independent electrodes, making it possible to measure the capacitance and the distance between the electrodes and an object in proximity up to distances of several tens, even hundreds of millimeters. The electrodes can be produced transparently by using for example indium tin oxide (ITO), and deposited on the display screen.

These interfaces equipped with space measurement capabilities open up new possibilities for interaction between the user and the machine, and make it possible to envisage new human-machine interface (HMI) control modes in which distance or depth data would be fully exploited in order to "browse" through the interface software.

Document US 2008/0307360 from Chaudhri et al. is known, which discloses human-machine interface software with a three-dimensional component. However, the three-dimensional aspect is limited to a representation within an environment in which computer objects (icons, files, etc.) have a three-dimensional appearance. The interface control mode, in particular for selecting objects, remains strictly two-dimensional as it is based on the detection of events such as the movement of a mouse cursor in the plane of the interface.

The purpose of the present invention is to propose a method for the selection of commands (or computer objects) in a human-machine interface (HMI) equipped with three-dimensional measurement capabilities, which makes full use of the three-dimensional aspect of the measurements in the interface software.

SUMMARY

This objective is attained with a method for selecting commands, implementing a command interface, a display and at least one sensor suitable for detecting at least one command object, comprising the steps of:
  obtaining distance data between said command object(s) and said command interface by means of said sensor(s),
  displaying on said display at least one symbol representing a command or a set of commands according to a display mode,
  characterized in that it comprises moreover a step of using said distance data in order to determine said display mode of the symbol(s).

The method according to the invention can comprise moreover the steps of:
  obtaining position data of at least one command object with respect to the command interface by means of the sensor(s),
  using said position data in order to determine the display mode of the displayed symbol(s).

The display mode of a symbol can comprise differentiated graphical representations of this symbol making it possible to show a state such as emphasis for making a selection, the selection itself, the execution of a command, a movement, a rotation, a change, etc. The display mode can correspond for example to highlighting, graphical differentiation with respect to other displayed symbols by means of a change of colour or size, or re-displaying the symbol in a different manner and shifted so as to be visible for example beyond a command object.

The method according to the invention can comprise moreover a step of using at least one of the following data sets: distance data, distance and position data, in order to determine the displayed symbol(s).

Determining the displayed symbol can comprise selecting symbols shown on the display, therefore accessible commands and/or groups of commands on the interface, according to distance and/or position data.

The distance and position data can comprise:
  measurements of distances and/or positions;
  data provided by the sensors (for example the physical variables measured by these sensors) and depending (preferably in a monotone manner) on the distance and/or the position of the command object(s) with respect to the command interface;
  variables representing speeds and/or accelerations of the command object, corresponding to variables derived from distances and/or positions;
  data with respect to trajectories, i.e. time sequences of distances and/or trajectories.

According to embodiments, the method according to the invention can implement at least one of the following measurement types:
  measurements of capacitive interactions between a command object and the sensor(s),
  measurements of variations of light intensity due to the presence of a command object.

These measurements can make it possible in particular to obtain distance and/or position data.

The measured capacitive interactions can comprise in particular:

a direct capacitive coupling between a command object and capacitive electrodes of sensors, in which case the electrical capacitances between the object and the electrodes is measured, or the disturbance of a capacitive coupling between electrodes of sensors due to the presence of the command object, in which case the variations of these coupling capacitances are measured.

The variations in measured light intensities can be generated for example by the interruption of light beams by command objects, or shade effects due to the presence of command objects.

The method according to the invention can comprise moreover the steps of:

displaying a first symbol representing a first set of commands, when the distance of a command object is less than a threshold distance, displaying at least one second symbol representing a command or a set of commands included in said first set of commands.

This inclusion can be defined in a logical manner, such as for example in a tree structure of hierarchical commands, or a stack of commands or sets of commands.

The second symbols can be displayed at positions that are substantially different to that of the first symbol on the display, for example so as not to mask the first symbol.

The method according to the invention can comprise moreover the steps of:

displaying a first symbol representing a first command or a first set of commands, when the distance of a command object is less than a threshold distance, displaying a second symbol representing a second command or a second set of commands.

The second symbol can be displayed at a position substantially identical to that of the first symbol on the display, such as for example to illustrate a depthwise movement in a stack of symbols from which elements will be removed as the movement of the command object progresses.

The method according to the invention can comprise moreover a step of selecting a command comprising a step of verifying at least one selection condition based on a data set from: distance data, distance and position data.

It can comprise moreover a step of verifying at least one selection condition from the following selection conditions:

the distance of the command object is less than a predetermined selection distance, the distance of the command object is less than a predetermined selection distance during a predetermined minimum duration, the command object is in contact with the surface of the command interface, the command object performs a rapid to-and-fro movement over a distance, i.e. for example a to-and-fro movement over a distance less than a predetermined distance for a duration less than a predetermined duration, at least two command objects perform a converging movement towards a predetermined position, such as a gripping or pinching movement (or any other relative movement).

The selection of a command can take place when the command objects are in proximity to or converging towards a position defined for this command.

The method according to the invention can comprise moreover a step of executing a (previously selected) command of one of the following types: executing a computer program, executing an application, displaying the content of a folder stored on computer storage media, displaying an image, playing a sound, reading multimedia content, or any other command.

The method according to the invention can comprise moreover a step of executing a command for moving a symbol, the latter comprising:

a step of displaying said symbol according to a position representing a position of a command object or of a set of command objects, a step of validating the movement of said symbol comprising a step of verifying at least one validation condition based on a data set from: distance data, distance and position data.

The method according to the invention can comprise moreover a step of verifying at least one validation condition from the following validation conditions:

the distance of the command object is less than a predetermined selection distance, the distance of the command object is less than a predetermined selection distance during a predetermined minimum duration, the command object is in contact with the surface of the command interface, the command object performs a rapid to-and-fro movement over a distance, at least two command objects perform a diverging movement around a predetermined position (or any other relative movement).

According to embodiments, the method according to the invention can comprise moreover the steps of:

displaying symbols in the form of icons;

activating the display when the distance of the command object is less than a predetermined activation distance, for example so as to power down the screen when it is not in use and save energy.

According to another aspect, a device is proposed for selecting commands, comprising:

a command interface, a display, at least one sensor suitable for detecting a command object, electronic and calculation means suitable for producing by means of said sensor(s) distance data between at least one command object and said command interface, display management means suitable for producing a display of at least one symbol representing a command or a set of commands, said device comprising moreover calculation means suitable for processing said distance data in order to determine the displayed symbol(s).

The display can be a display screen, or any other display means, for example in relief (3D display).

The command interface, the sensors and the display can be according to any arrangement, such as for example:

superimposed, with a display integrated in a command interface comprising the sensors arranged over its surface area or its periphery;

separate, with on the one hand a command interface provided with sensors and on the other hand a display. The command interface can in particular be an input pad linked to a computer, and the display can be the computer screen, separate from the input pad.

The device according to the invention can comprise moreover:

electronic and calculation means suitable for producing by means of the sensor(s) position data of at least one command object with respect to said command interface, calculation means suitable for processing said position data in order to determine the displayed symbol(s).

According to embodiments, the device according to the invention can comprise moreover sensors of at least one of the following types:

capacitive sensors,
optical sensors.

The optical sensors can comprise for example light barriers with light sources emitting light beams and photodetectors arranged so as to be illuminated by these light beams when they are not interrupted by command objects. They can also comprise photodetectors sensitive to lighting variations such as the effects of shade or reflection due to the presence of command objects, for example integrated in a screen based on TFT or OLED technology.

According to embodiments, the device according to the invention can moreover comprise all types of sensors suitable for producing distance and/or position data. It can in particular comprise ultrasound acoustic sensors, arranged for example so as to allow location of the command objects by echo and triangulation measurements.

According to yet another aspect, a device is proposed of one of the following types: computer, telephone, smartphone, tablet, display screen, terminal, characterized in that it comprises a device for selecting commands implementing the method according to the invention.

BRIEF DESCRIPTION OF THE DRAWINGS

Other advantages and features of the invention will become apparent on reading the detailed description of implementations and embodiments which are in no way limitative, and from the following attached drawings:

FIG. 3 shows a structure for sets of commands with the position and distance conditions allowing access to them, and a example browsing path through this structure, FIGS. 4 (a) to (d) show a time sequence for symbols for commands or for a set of commands as they are displayed on the display screen when the structure in FIG. 3 is browsed through, FIGS. 5(a), 5(b) and 5(c) show a first variant of a time sequence for symbols for commands or for a set of commands as they are displayed when a stack is browsed through, while FIGS. 5(a), 5(b), 5(d) and 5(e) show a second variant of this time sequence.

DETAILED DESCRIPTION

An embodiment of the invention will be described implementing a human-machine interface (HMI) which comprises capacitive sensors. Of course, this embodiment is an example that is in no way limitative of implementation of the invention. Such an interface is for example well suited to producing a human-machine interface (HMI) for a host system such as a mobile phone, a smartphone, a tablet or a computer.

Figure 1:
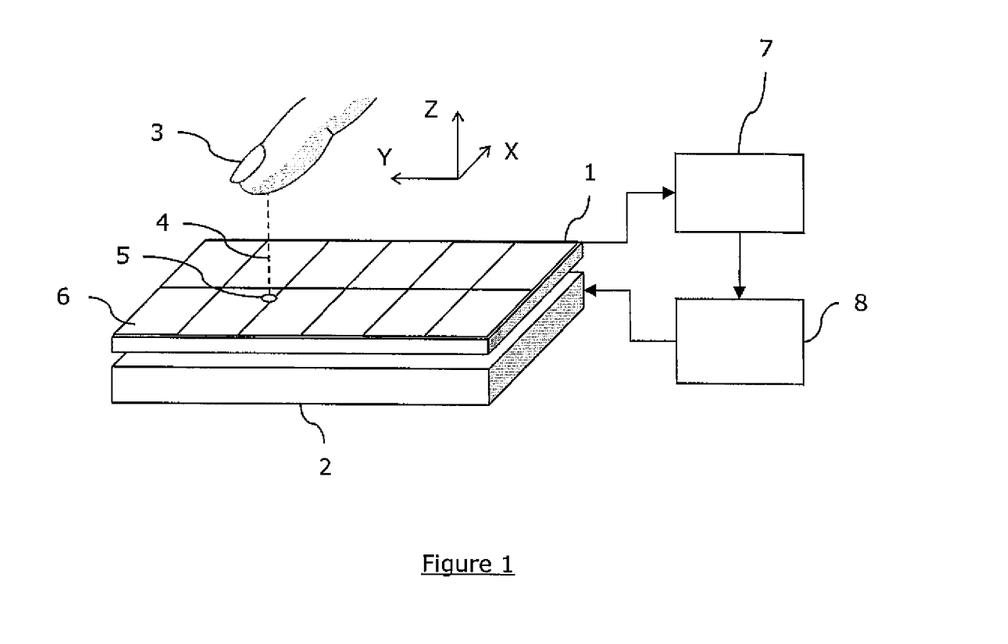
FIG. 1 shows a schematic diagram of a three-dimensional human-machine interface according to the invention.

With reference to FIG. 1, the interface comprises:

a display screen 2, based, non-limitatively, on a liquid crystal display (LCD), thin-film transistor (TFT), or organic light-emitting diode (OLED);

a command interface 1 comprising a substantially transparent detection surface equipped with capacitive sensors 6 that are also substantially transparent and suitable for detecting the presence of at least one command object 3 such as a hand, a finger or a stylus.

The sensors 6 provide data relating to the distance 4 along the axis Z between the object 3 and the detection surface of the interface 1, and data relating to the position 5 in the plane (X, Y) of a projection along the axis Z of the object 3 on the command interface 1. They are also able to detect a contact between the command object 3 and the detection surface of the interface 1.

The data relating to the distance 4 and to the position 5 comprise equivalent measurements of distance 4 and of position 5. These measurements, not necessarily expressed in units of length, are translations of measurements of capacitances or variations of capacitances. In particular, physical characteristics of the command object 3 can affect the measured capacitances and therefore their translation in terms of equivalent distance and/or positions.

The data relating to the distance 4 and to the position 5 can comprise moreover trajectories, defined like time sequences of distances 4 and/or positions 5, and derived values such as speeds and accelerations.

The sensors 6 comprise capacitive electrodes based on indium tin oxide (ITO). Depending on the applications, these can have a varied number and arrangement, FIG. 1 being merely for the purposes of illustration.

The capacitive electrodes of the sensors 6 are linked to an electronic measurement unit 7 which makes it possible to calculate the distance 4 and the position 5. There are several possible embodiments for the capacitive sensors 6 and the electronic measurement unit 7.

Advantageously, the sensors 6 and the electronic measurement unit 7 are produced according to a method described in document FR 2 844 349 by Rozière. They comprise a plurality of independent electrodes 6 distributed over the surface area of the interface 1. These electrodes 6 are linked to an electronic measurement unit 7 that uses floating point detection or in other words referenced to a floating electrical potential. A guard electrode, also with floating reference potential, is placed along the rear face of the measurement electrodes 6, between them and the display screen 2, so as to eliminate any parasitic capacitance. All the electrodes have the same potential and there is thus no capacitive coupling between the electrodes that is capable of degrading the capacitance measurement. This electronic detection unit 7 and its methods of implementation that can be used within the framework of the present invention are also described in detail in the document FR 2 756 048 by Rozière to which reference is made herein.

Scanners make it possible to sequentially measure the capacitance and therefore the distance between the electrodes 6 and the command object 3. The electrodes 6 which are not "polled" are also kept at the same potential as the guard electrode, still to eliminate parasitic capacitances.

Whether a computer, a mobile phone, tablet or any other system whatever is involved, the host system also comprises computer calculation means 8. These calculation means 8 usually comprise a microprocessor unit (central processing unit (CPU)) combined with components such as random access memories (RAM), mass storage means (hard disk, flash memory, etc), and allow one (or a plurality) of computer programs or software to be executed.

A part of this software, also called interface software, is dedicated to HMI management tasks. This interface software contributes to carrying out the steps of the method according to the invention, which comprise:
- steps of obtaining distance (or measurement) data 4 and position data 5 provided by the sensors 6 and their electronic measurement unit 7,
- steps of updating the display 2 based on data from the sensors 6 and data from the host system (telephone, computer, etc.),
- steps of transmitting commands from the user to the host system.

The human-machine interface software (HMI software) corresponds to what the user sees on the display 2. He interacts with this HMI software by using one or more of the command objects 3 such as his fingers, a stylus, etc.

Conventionally, the HMI software comprises a representation in graphical, symbolic form, of the host system and/or of the possible actions:
- executing software, applications, tasks interacting with the hardware and/or software components of the host system,
- displaying, reproducing, copying, moving, handling of data represented in graphical form or by means of symbols, etc.

Without restriction, it is possible to call all the actions that a user can carry out via the command object 3 and the HMI command software.

These commands are represented graphically on the display 2 by symbols such as icons with which the user can interact by means of the command object 3.

An important challenge in the design of HMIs is the organization and structuring of the representation of the commands so that the user can easily find and select them, by moving or "browsing" through the interface.

The commands can be organised according to hierarchical structures of a three-dimensional nature, which represent sets of commands and among which are distinguished in particular:
- tree structures or folder trees in which each folder comprises a set of commands and/or subfolders,
- stacked structures or stacks in which commands and/or sets of commands are represented by symbols (or icons) which appear to be stacked.

The HMIs of the prior art are based essentially on a two-dimensional type browsing, which takes into account only the position 5 of the command object 3 for selecting commands, whether this involves the mouse cursor (hover or click), a physical contact between an object 3 and the detection surface of the interface 1 (tapping) or even hovering over the detection surface of the interface 1. Thus, even browsing through structures of a three-dimensional nature is in fact reduced to a set of actions in the same plane. It is necessary for example to tap on an icon to open a folder and display its content or show stacked commands, i.e. access a different hierarchical (or topological) level.

Advantageously, the method according to the invention makes it possible to browse in a truly three-dimensional manner through an HMI by using the distance measurements 4. It makes it possible in particular to access the different hierarchical (or topological) layers of a set of commands arranged according to a three-dimensional type structure by varying the distance 4 between the command object 3 and the detection surface of the interface 1. This "access" is shown on the display 2 by displaying the symbols (or icons) representing a command or a set of commands of the selected hierarchical (or topological) level as a function of the distance 4.

Browsing is called three-dimensional inasmuch as it is possible by using the distance data 4 to browse hierarchical or topological levels of a command structure and/or command groups for which levels can be shown on the display 2 by one or a plurality of symbols.

It is moreover possible to browse through a particular hierarchical command structure among a plurality of such command structures shown on the display, without affecting the others, by using the position measurement 5. In fact, it is provided that only one command structure the graphical symbol of which is hovered over by the command object 3 (therefore for which the position 5 is close to or over its graphical symbol) "sees" its display changed as a function of the hierarchical level corresponding to the distance 4.

Once displayed, a command can be selected by selecting its representative symbol on the HMI. This selection can be carried out in particular with a view to its execution, or to move the symbol representing it on the display 2 (in which case the command in question comprises the movement of the symbol on the display).

Selecting a command comprises the verification of at least one selection condition, or in other words, the selection of a command is validated when one or more selection conditions (or time sequences of selection conditions) are satisfied. Various selection conditions can be implemented, including within a single HMI.

Different selection conditions can be implemented in order to allow the execution of different commands optionally attached to or represented by the same symbol on the display 2. These commands can for example relate to executing an application represented by an icon, and moving this icon.

From the applicable selection conditions within the framework of the invention, the following selection conditions are distinguished:
- the distance 4 of the command object 3 is less than a predetermined selection distance,
- the command object 3 is in contact with the surface of the command interface 1.

These selection conditions based on detection of a minimum distance 4 or distance less than a threshold can be used without creating ambiguity with respect to the command selection tasks because a command does not have a lower hierarchical or topological level (at least in the application in which this command is selected). In order to further limit the risks of ambiguities, it can be arranged to display the corresponding symbol so that it does not cover the symbols corresponding to command groups of (at least) the same hierarchical structure, and use the position measurement 5 in order to determine the selected command.

These selection conditions can be implemented by adding a duration condition (a predetermined minimum duration) in order to limit the risks of false commands.

Selection conditions can also be implemented based on trajectories, such that:
- the command, object 3 performs a rapid to-and-fro movement over a distance 4, i.e. for example a to-and-fro movement within a distance range (or difference) 4 less than a predetermined distance for a duration less than a predetermined duration.

A condition of this type corresponds to a virtual "click" performed without contact. As previously, the position measurement 5 is used to determine the selected command.

Finally, the selection conditions can be implemented based on the trajectories of several command objects, such that:

at least two command objects perform a movement the position of which converges towards a position 5 corresponding to the command symbol, according to a gripping or pinching movement.

A selection condition can be also be used as a deselection or validation condition, in particular for "releasing" an object when the command relates to a manipulation or a movement of a symbol on the display 2.

Specific validation or deselection conditions can be provided, such as for example a diverging opening movement, of several command objects 3. Thus, moving a symbol on the display 2 by using two fingers as command objects 3 can be obtained by a pinch (selection) sequence, movement (the selected symbol follows the fingers), and opening the fingers (deselection).

In order to assist the user with browsing, the position 5 and the distance 4 of the command object 3 can be shown on the display screen 2 by means of a circular pattern centred on the position 5 and having a diameter dependent on the distance 4, or any other pattern.

An implementation of the method according to the invention for browsing tree type command structures folders will be described.

This tree structure comprises command groups or folders represented by the symbol or the icon 10, and commands represented by the symbol or the icon 11 on the display screen 2.

Figure 2:
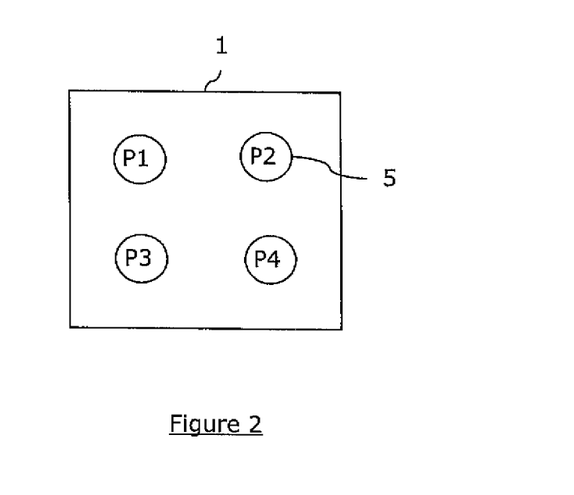
FIG. 2 shows a designation convention for positions on the detection surface.

With reference to FIG. 2, in order to simplify the explanations four areas P1, P2, P3, P4 will be defined: corresponding to four positions 5 on the detection surface of the interface 1 and on the display screen 2 placed underneath. Also, the command object 3 is equivalent to the finger 3 of a user.

Figure 3:
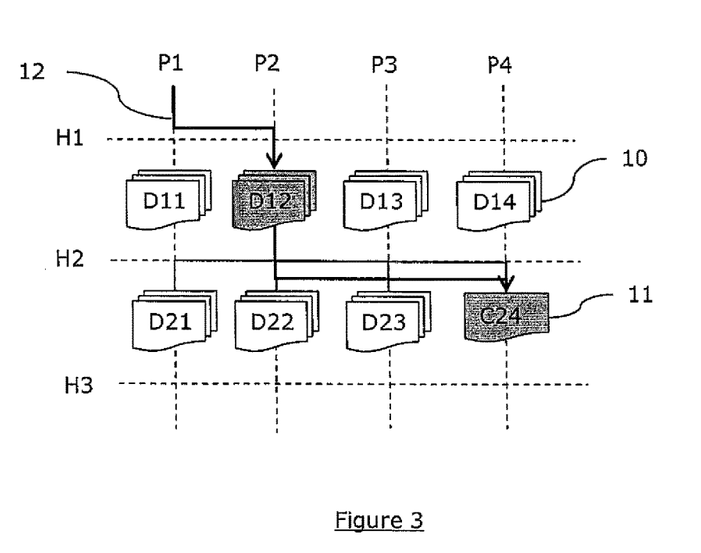

With reference to FIG. 3, four command structures are defined for the example, the first hierarchical level of which, i.e. respectively the sets of commands D11, D12, D13 and D14, is accessible when the command object 3 is at distances 4 comprised between H1 and H2.

The sets of commands D21, D22, D23 and the command C24 which are included in D12 are also defined, belonging to a second hierarchical level accessible when the command object 3 is at distances 4 comprised between H2 and H3.

The arrows 12 show the trajectory in space of the finger 3 over the distances 4 (H1, H2, H3) and positions 5 (P1, . . . P4) corresponding to the example below.

Figure 4:
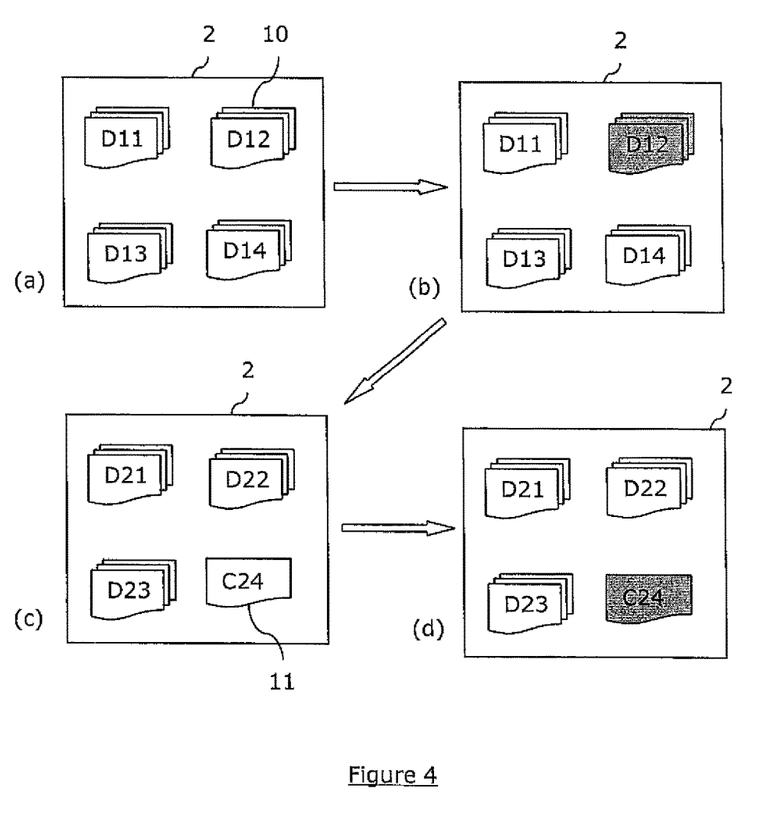

With reference to FIG. 4, the method of selecting the command C24 on the display 2 will be shown.

Firstly, as shown in FIG. 4(*a*), the finger 3 is at a distance 4 greater than H1 and no set of commands is selected on the display screen 2.

The user then lowers his finger 3 to a distance 4 comprised between H1 and H2. When his finger hovers over the position P2, the set of commands D12 is made prominent. To this end the corresponding symbol or icon is for example highlighted, or graphically differentiated from the others by means of a change of colour or size; or re-displayed differently and shifted so as to be visible beyond the finger 3. This situation is shown in FIG. 4(*b*).

By lowering his finger 3 above the position P2 at a distance 4 comprised between H2 and H3, the user accesses the content of D12. The corresponding sets of commands D21, D22, D23 and the command C24 are displayed, according to FIG. 4(*c*).

The user can then move his finger 3 to P4 to highlight the command C24 as shown in FIG. 4(*d*) and, by carrying out an action such as lowering his finger to a distance 4 less than H3, or tapping the detection surface of the interface 1, or even performing a virtual click (a rapid to-and-fro of the finger 3 vis-à-vis the surface of the interface 1), select the command C24 so that it is executed.

Display of a new hierarchical level can replace that of the previous level in order to maintain good legibility, for example on a small screen 2. It is also possible to display the content of a lower hierarchical level in proximity to the symbol of the selected command group of a higher hierarchical level.

According to an embodiment, the symbol representing a command group (or its icon) can comprise a representation of the symbols of the elements or commands that it includes (thus a representation of their icons reduced in size), and displaying the icons of the content can be performed so that the user has the impression of zooming in on the content when accessing the hierarchical level of this content.

An implementation of the method according to the invention for browsing command structures of the type stack of commands or stack will now be described.

Figure 5:
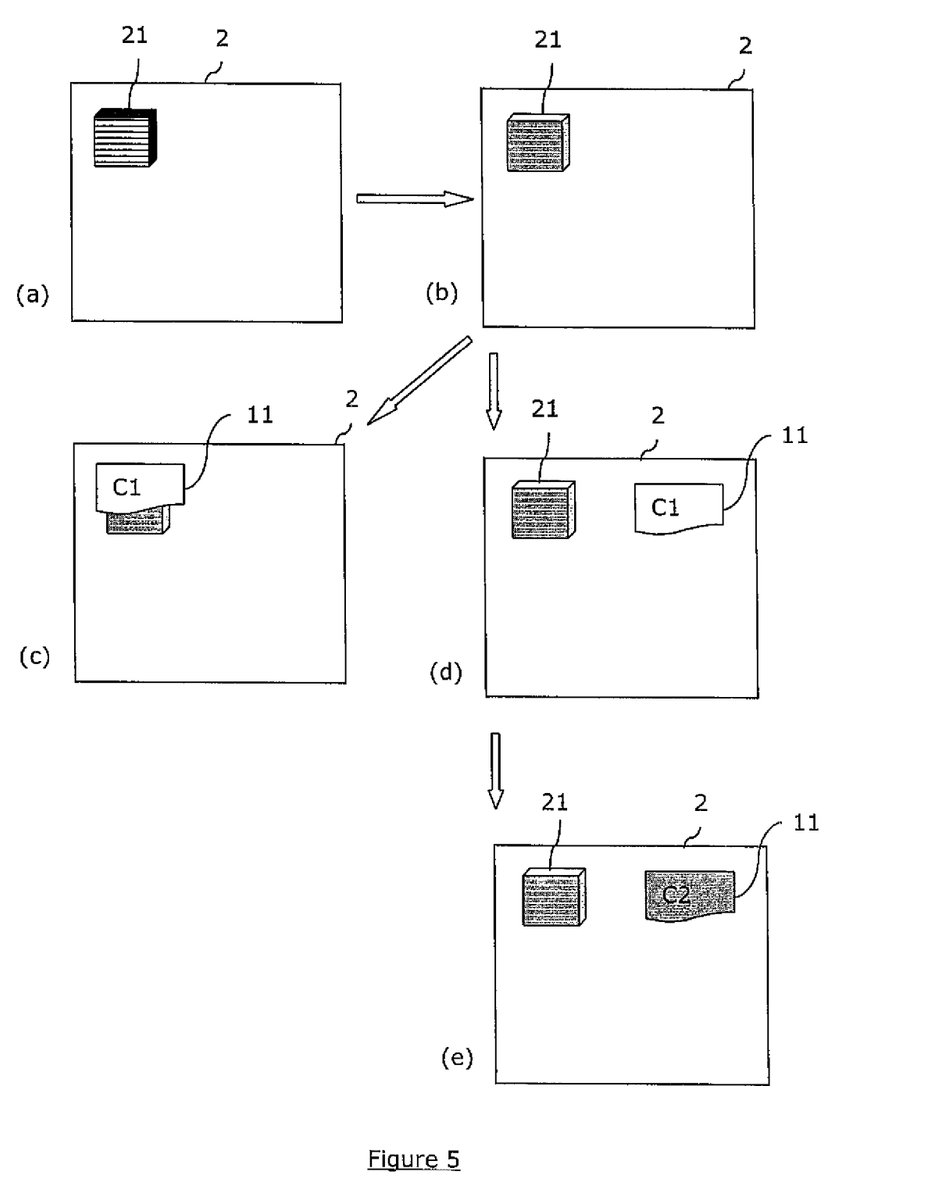
Figure 6:
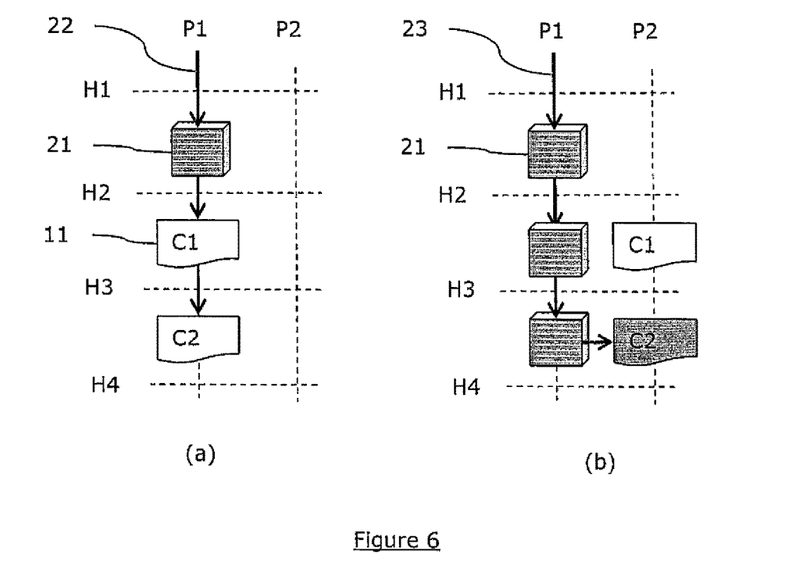
FIG. 6 shows a stack of commands or sets of commands with the position and distance conditions making it possible to access the elements, according to a first variant shown in FIG. 6(a) and corresponding to FIGS. 5(a), 5(b) and 5(c), and according to a second variant shown in FIG. 6(b) and corresponding to FIGS. 5(a), 5(b), 5(d) and 5(e), respectively.

With reference to FIGS. 5 and 6, commands can be assembled on the display screen 2 in the form of a stack 21 which groups together commands 11 and/or sets of commands 10. In the interests of clarity, FIG. 5 shows a case where there is only one stack 21 of commands 11 initially visible on the display 2.

Firstly, as shown in FIG. 5(*a*), the finger 3 is at a distance 4 greater than a distance H1 and no command or set of commands is selected.

The user then lowers his finger 3 to a distance 4 comprised between distances H1 and H2 as shown in FIGS. 6(*a*) and 6(*b*). When his finger passes close to the position P1, the stack 21 is made prominent (for example highlighted or following the other methods described previously). The situation is shown in FIG. 5(*b*).

Then two variants are possible.

According to a first variant shown in FIG. 5(*c*) and FIG. 6(*a*), by lowering his finger 3 above position P1 to a distance 4 comprised between H2 and H3, the user displays the first command C1 of the stack, the symbol of which is substantially superimposed on this stack 21.

Then, by lowering his finger 3 above the position P1 to a distance 4 comprised between H3 and H4, he displays the second command C2 of the stack, and so on.

The arrows 22 in FIG. 6(*a*) show the trajectory in space of the finger 3 over distances 4 (H1, . . . H4) and to positions 5 (P1, P2) corresponding to this variant.

This variant is well suited for example to displaying images, in which case the symbol is the image and the command simply its display.

According to a second variant shown in FIGS. 5(*d*), 5(*e*) and FIG. 6(*b*), by lowering his finger 3 above the position P1 to a distance 4 comprised between H2 and H3, the user displays the first command C1 of the stack, the symbol of which is displayed at a position different from P1, for example P2. Thus the display shown in FIG. 5(*d*) is obtained.

If the user continues to lower his finger 3 above the position P1 to a distance 4 comprised between H3 and H4, he displays at P2 the second command C2 of the stack, and so on.

In this variant, the user can highlight a displayed command for the purpose of selecting it by moving his finger 3 to position P2. This situation is shown in FIG. 5(*e*) with the selection of C2.

The arrows 23 in FIG. 6(*b*) show the trajectory of the finger 3 in space over distances 4 (H1, . . . H4) and to positions 5 (P1, P2) corresponding to this variant.

As stated previously, the stack 21 can comprise commands 11 and/or sets of commands 10. Once a command 11 or a set of commands 10 is highlighted, it is possible to select it or browse through its tree structure in the same way as previously described in relation to FIGS. 3 and 4.

The distance thresholds 4 can be managed as follows, it being understood that several methods of managing these thresholds can be implemented according to the command structures in question, and/or choices that the user can make via a configuration menu:
- a first threshold of distance H1 making it possible to select a particular command structure is defined as corresponding to a predetermined distance 4,
- when a command structure or stack 21 is selected, the distance intervals between successive thresholds H1, H2, H3, etc. are calculated taking account of the number of hierarchical levels of the structure or of the number of elements 10, 11 of the stack 21, so as to allow them all to be browsed by varying the height 4 of the finger 3 until contact is made with the detection surface of the interface 1,
- the selection of a command is carried out by a contact of the finger 3 with the detection surface of the interface 1.

Figure 7:
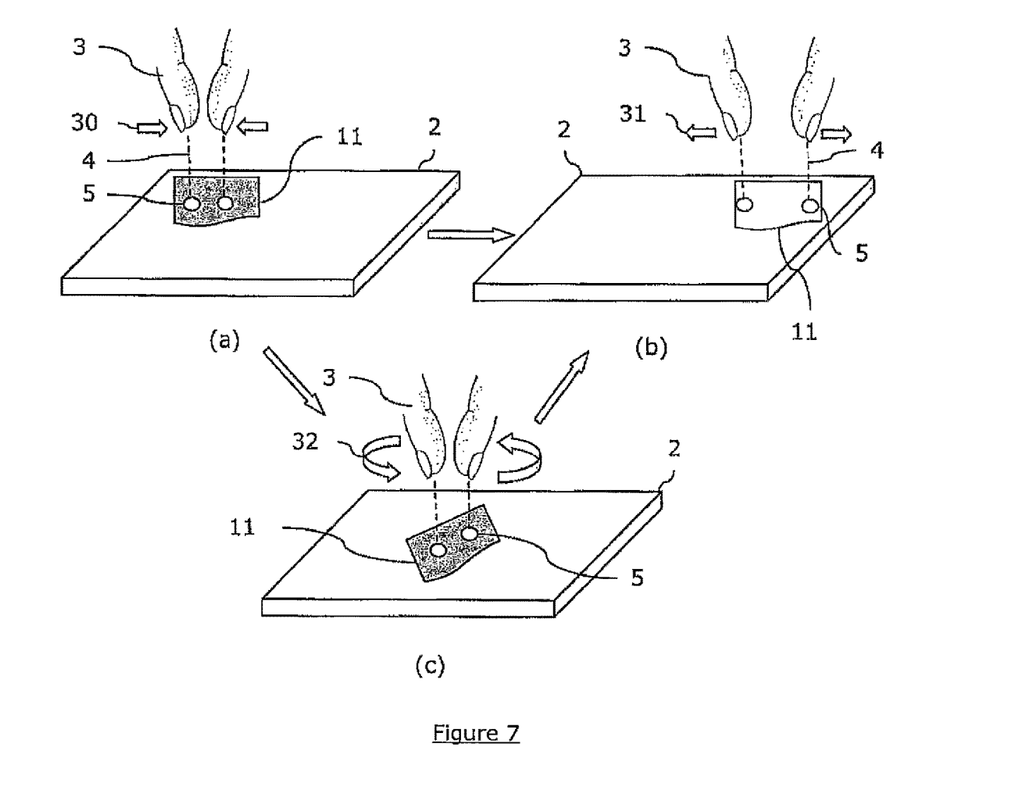
FIG. 7 shows an illustration of a movement command sequence with, in FIG. 7(a), the selection of the command, FIG. 7(b) the validation of the command and FIG. 7(c) a rotation of the symbol.

With reference to FIG. 7, an implementation of the method according to the invention will now be described for executing a command for moving a command symbol 11 or a command group symbol 10, 21.

A particular command symbol 11 can represent several command possibilities (execution of an application for example), or only a movement command (for example if the symbol represents part of a set displayed on the display screen 2).

In the case of a plurality of possible commands, it is sufficient to define different selection conditions for each of them in order to avoid any ambiguity.

Firstly, the user moves two (or more) fingers 3 closer to the surface of the interface 2, until reaching a distance at which the sensors 6 become able to "distinguish" the fingers. When the fingers 3 are detected, and if their positions 5 correspond substantially to that of the symbol 11 on the display 2, the symbol 11 is made prominent (for example highlighted). Depending on the devices, it can be necessary for the fingers 3 to contact the surface of the interface 2.

Alternatively, the user can also browse a structure or command stack as explained previously to reach the step in which the symbol 11 is made prominent.

Then, the user selects the command for moving the command symbol 11 by performing a pinching movement 30 or moving the fingers 3 closer together as shown in FIG. 7(*a*). This movement corresponds, from the measurement point of view, to bringing the positions 5 closer together which is the chosen selection condition.

The symbol 11 can be moved by moving the fingers 3, following their position.

Validation of the command, and therefore the position of the symbol 11 at an arrival position, is performed by moving the fingers further apart, as shown in FIG. 7(*b*). This moving further apart 31 corresponds, from the measurement point of view, to distancing the positions 5 which is the chosen validation condition.

It is also possible, as shown in FIG. 7(*c*), to turn the symbol 11 by performing a rotation movement 32 with the fingers 3.

If the distance 4 of the fingers 3 is increased beyond a certain limit during the movement, according to the applications it can be provided that the symbol 11 freezes, changes its appearance, disappears or returns to its starting position. An increase in the distance 4 beyond a certain limit can also be used as a deselection condition for the movement command without validating it, with the symbol 11 returning to its starting position.

This method for controlling movement commands can allow for example a play mode for board games such as chess, draughts, etc. to be implemented.

According to variant embodiments:
- The capacitive sensors and their associated electronic detection unit can be produced in any way whatever. In particular, they can comprise crossed electrodes (for example arranged in lines and columns), and allow direct capacitance measurements (i.e. measurements of capacitances between the electrodes 6 and the object 3), and/or measurements of coupling capacitances (i.e. measurements of capacitances between emitting electrodes and receiving electrodes, disturbed by the presence of the object 3). Such embodiments are for example well suited to large-dimension interfaces 1 covering computer display screens 2;
- The method according to the invention is applicable to the selection of commands in all command structures or groups of commands for which it is possible to browse the hierarchical or topological levels by using the distance data 4, and showing these levels on the display 2 by means of one or more symbols or icons;
- Browsing through the hierarchical or topological levels of the command structures can depend on distance(s) 4 and/or position(s) 5, as well as all data relating to these values such as speeds and accelerations. For example, account can be taken of the speed of movement of a command object 3 over distance 4 for browsing a stack or another command structure more rapidly, by displaying only one element out of n elements;
- The intervals between the threshold distances 4 (H1, etc.) can be determined in any manner whatever. In particular they can be fixed, predefined, adjusted according to the level number of a command structure displayed so that a structure can still be browsed in its entirety within the same overall distance interval 4, variable within a limited range, etc.;
- In order to save energy, in particular for roaming appliances, a time delay can be provided which powers down the screen 2 after a period of inactivity. The screen 2 is then reactivated for example when a command object 3 appears at a distance 4 less than an activation distance, or simply when an object is detected by the sensors 6.

Of course, the invention is not limited to the examples which have just been described and numerous adjustments can be made to these examples without exceeding the scope of the invention.

The invention claimed is:

1. A method for selecting commands on a command interface including a display and at least one sensor configured for detecting at least one command object, comprising:
displaying a plurality of sets of commands, wherein one or more of the sets of commands includes a plurality of hierarchical levels of commands;
obtaining vertical distance data and horizontal position data of said at least one command object in relation to the command interface using said at least one sensor; and
using said vertical distance data and said horizontal position data to browse the commands in the plurality of sets of commands, the browsing including:
selecting one set of commands from the displayed plurality of sets of commands,
in accordance with a determination that the vertical distance of said at least one command object is a first distance from said command interface while the horizontal position data of said at least one command object corresponds to a location of the selected one set of commands, displaying, at a respective location on the display, a first command in the selected one set of commands, and
in accordance with a determination that the vertical distance of said at least one command object is a second distance, different from the first distance, from said command interface while the horizontal position data of said at least one command object corresponds to the location of the selected one set of commands, displaying, at the respective location, a second command in the selected one set of commands without displaying the first command.

2. The method of claim 1, further comprising:
using said horizontal position data in order to determine a display mode of the plurality of sets of commands.

3. The method of claim 2, further comprising using at least one of the vertical distance data, and the vertical distance data and the horizontal position data, to determine the display mode.

4. The method of claim 1, further comprising at least one of:
measuring capacitive interactions between the at least one command object and the at least one sensor; and
measuring variations of light intensity due to a presence of the at least one command object.

5. The method of claim 1, further comprising selecting, while the command object hovers over the command interface, a particular command of the commands in the hierarchical levels of commands by verifying at least one selection condition based on at least one of the vertical distance data, and the vertical distance data and the horizontal position data, wherein the at least one selection condition comprises one or more of:
the distance of the at least one command object is less than a predetermined selection distance, and
the distance of the at least one command object is less than a predetermined selection distance during a predetermined minimum duration.

6. The method of claim 5, further comprising executing the particular command by performing one or more of executing a computer program, executing an application, displaying content of a file stored on computer storage media, displaying an image, playing a sound, and reading multimedia content.

7. The method of claim 5, further comprising executing a command for moving a symbol by:
displaying said symbol according to a position representing a position of a command object or a set of command objects; and
validating a movement of said symbol by verifying at least one validation condition based on at least one of the distance data, and the distance and position data.

8. The method of claim 7, the at least one validation condition comprising one or more of:
the distance of the at least one command object is less than a predetermined selection distance,
the distance of the at least one command object is less than a predetermined selection distance during a predetermined minimum duration,
the at least one command object is in contact with a surface of the command interface,
the at least one command object performs a rapid to-and-fro movement over distance, and
at least two command objects perform a divergent movement in position around a predetermined position.

9. The method of claim 1, further comprising selecting, while the command object hovers over the command interface, a particular command of the commands in the hierarchical levels of commands by verifying at least one selection condition based on at least one of the vertical distance data, and the vertical distance data and the horizontal position data, wherein the at least one selection condition comprises one or more of:
the at least one command object performs a rapid to-and-fro movement over distance, and
at least two command objects perform a convergent movement in position towards a predetermined position.

10. The method of claim 1, further comprising displaying symbols in the form of icons.

11. The method of claim 1, further comprising activating the display when the vertical distance data of the at least one command object is less than a predetermined activation distance.

12. The method of claim 1, wherein the selecting the one set of commands comprises:
in accordance with a determination that the vertical distance of said at least one command object is a third distance, different from and greater than the first distance and the second distance, from said command interface, selecting the one set of commands from the displayed plurality of sets of commands.

13. The method of claim 12, wherein the third distance is less than a first threshold distance from said command interface but greater than or equal to a second threshold distance, smaller than the first threshold distance, from said command interface; and
wherein a vertical distance of said at least one command object less than the first threshold distance but greater than or equal to the second threshold distance selects the one set of commands.

14. The method of claim 13, wherein the first distance is less than the second threshold distance from said command interface but greater than or equal to a third threshold distance, smaller than the second threshold distance, from said command interface; wherein a vertical distance of said at least one command object less than the second threshold distance but greater than or equal to the third threshold distance corresponds to the display of the first command; wherein the second distance is less than the third threshold distance from said command interface but greater than or equal to a fourth threshold distance, smaller than the third threshold distance, from said command interface; and wherein a vertical distance of said at least one command object less than the third threshold distance but greater than or equal to the fourth threshold distance corresponds to the display of the second command.

15. The method of claim 14, wherein the first threshold distance is a predetermined distance and the second, third and fourth threshold distances are determined as functions of a number of commands or hierarchical levels of commands corresponding to the selected one set of commands.

16. The method of claim 1, wherein the respective location on the display is the same as a location of the selected one set of commands, such that displaying the first command or the second command comprises superimposing the first command or the second command substantially over the selected set of commands.

17. The method of claim 1, wherein the respective location on the display is different than, but proximate to, a location of the selected set of commands.

18. The method of claim 1, wherein the browsing further includes navigating from the selected one set of commands to the first or second command based on horizontal position data.

19. The method of claim 1, further comprising selecting a particular command of the commands in the hierarchical levels of commands by verifying at least one selection condition based on the vertical distance data, wherein the at least one selection condition further comprises one or more of:
the distance of the at least one command object is less than a predetermined selection distance,
the distance of the at least one command object is less than a predetermined selection distance during a predetermined minimum duration, and
the at least one command object is in contact with the surface of the command interface.

20. A device for selecting commands, comprising:
a command interface;
a display;
at least one sensor configured for detecting at least one command object; and
a microprocessor unit capable of:
causing a displaying of a plurality of sets of commands, wherein one or more of the sets of commands includes a plurality of hierarchical levels of commands,
obtaining vertical distance data and horizontal position data of said at least one command object in relation to the command interface using said at least one sensor, and
using said vertical distance data and said horizontal position data to browse the commands in the plurality of sets of commands, the browsing including:
selecting one set of commands from the displayed plurality of sets of commands, in accordance with a determination that the vertical distance of said at least one command object is a first distance from said command interface while the horizontal position data of said at least one command object corresponds to a location of the selected one set of commands,
displaying, at a respective location on the display, a first command in the selected one set of commands, and in accordance with a determination that the vertical distance of said at least one command object is a second distance, different from the first distance, from said command interface while the horizontal position data of said at least one command object corresponds to the location of the selected one set of commands,
displaying, at the respective location, a second command in the selected one set of commands without displaying the first command.

21. The device of claim 20, the at least one sensor comprising one or more of:
capacitive sensors, and
optical sensors.

22. The device of claim 20, incorporated into one of a computer, telephone, smartphone, tablet, display screen, and terminal.

23. The device of claim 20, the microprocessor unit further capable of selecting, while the command object hovers over the command interface, a particular command of the commands in the hierarchical levels of commands by verifying at least one selection condition based on at least one of the vertical distance data, and the vertical distance data and the horizontal position data, wherein the at least one selection condition comprises one or more of:
the distance of the at least one command object is less than a predetermined selection distance, and
the distance of the at least one command object is less than a predetermined selection distance during a predetermined minimum duration.

24. The device of claim 20, the microprocessor unit further capable of selecting, while the command object hovers over the command interface, a particular command of the commands in the hierarchical levels of commands by verifying at least one selection condition based on at least one of the vertical distance data, and the vertical distance data and the horizontal position data, wherein the at least one selection condition comprises one or more of:
the at least one command object performs a rapid to-and-fro movement over distance, and
at least two command objects perform a convergent movement in position towards a predetermined position.

25. The device of claim 20, wherein the selecting the one set of commands comprises:
in accordance with a determination that the vertical distance of said at least one command object is a third distance, different from and greater than the first distance and the second distance, from said command interface, selecting the one set of commands from the displayed plurality of sets of commands.

26. The device of claim 25, wherein the third distance is less than a first threshold distance from said command interface but greater than or equal to a second threshold distance, smaller than the first threshold distance, from said command interface; and
wherein a vertical distance of said at least one command object less than the first threshold distance but greater than or equal to the second threshold distance selects the one set of commands.

27. The device of claim 26 wherein the first distance is less than the second threshold distance from said command interface but greater than or equal to a third threshold distance, smaller than the second threshold distance, from said command interface; wherein a vertical distance of said at least one command object less than the second threshold distance but greater than or equal to the third threshold distance corresponds to the display of the first command; wherein the second distance is less than the third threshold distance from said command interface but greater than or equal to a fourth threshold distance, smaller than the third threshold distance, from said command interface; and wherein a vertical distance of said at least one command object less than the third threshold distance but greater than or equal to the fourth threshold distance corresponds to the display of the second command.

28. The device of claim 27 wherein the first threshold distance is a predetermined distance and the second, third and fourth threshold distances are determined as functions of a number of commands or hierarchical levels of commands corresponding to the selected one set of commands.

29. The device of claim 20, wherein the respective location on the display is the same as a location of the selected one set of commands, such that displaying the first command or the second command comprises superimposing the first command or the second command substantially over the selected set of commands.

30. The device of claim 20, wherein the respective location on the display is different than, but proximate to, a location of the selected set of commands.

31. The device of claim 20, wherein the browsing further includes navigating from the selected one set of commands to the first or second command based on horizontal position data.

32. The device of claim 20, the microprocessor unit further capable of selecting a particular command of the commands in the hierarchical levels of commands by verifying at least one selection condition based on the vertical distance data, wherein the at least one selection condition further comprises one or more of:
the distance of the at least one command object is less than a predetermined selection distance,
the distance of the at least one command object is less than a predetermined selection distance during a predetermined minimum duration, and
the at least one command object is in contact with the surface of the command interface.

33. A non-transitory computer-readable storage medium storing instructions, which when executed by a device including a display, at least one sensor configured for detecting at least one command object and one or more processors, cause the one or more processors to perform a method comprising:
displaying a plurality of sets of commands, wherein one or more of the sets of commands includes a plurality of hierarchical levels of commands;
obtaining vertical distance data and horizontal position data of said at least one command object in relation to the command interface using said at least one sensor; and
using said vertical distance data and said horizontal position data to browse the commands in the plurality of sets of commands, the browsing including:
selecting one set of commands from the displayed plurality of sets of commands, in accordance with a determination that the vertical distance of said at least one command object is a first distance from said command interface while the horizontal position data of said at least one command object corresponds to a location of the selected one set of commands, displaying, at a respective location on the display, a first command in the selected one set of commands, and in accordance with a determination that the vertical distance of said at least one command object is a second distance, different from the first distance, from said command interface while the horizontal position data of said at least one command object corresponds to the location of the selected one set of commands, displaying, at the respective location, a second command in the selected one set of commands without displaying the first command.

34. The non-transitory computer-readable storage medium of claim 33, the method further comprising:
using said horizontal position data in order to determine a display mode of the plurality of sets of commands.

35. The non-transitory computer-readable storage medium of claim 34, the method further comprising using at least one of the vertical distance data, and the vertical distance data and the horizontal position data, to determine the display mode.

36. The non-transitory computer-readable storage medium of claim 33, the method further comprising at least one of:
measuring capacitive interactions between the at least one command object and the at least one sensor; and
measuring variations of light intensity due to a presence of the at least one command object.

37. The non-transitory computer-readable storage medium of claim 33, the method further comprising selecting, while the command object hovers over the command interface, a particular command of the commands in the hierarchical levels of commands by verifying at least one selection condition based on at least one of the vertical distance data, and the vertical distance data and the horizontal position data, wherein the at least one selection condition comprises one or more of:
the distance of the at least one command object is less than a predetermined selection distance, and
the distance of the at least one command object is less than a predetermined selection distance during a predetermined minimum duration.

38. The non-transitory computer-readable storage medium of claim 37, the method further comprising executing the particular command by performing one or more of executing a computer program, executing an application, displaying content of a file stored on computer storage media, displaying an image, playing a sound, and reading multimedia content.

39. The non-transitory computer-readable storage medium of claim 37, the method further comprising executing a command for moving a symbol by:
displaying said symbol according to a position representing a position of a command object or a set of command objects; and
validating a movement of said symbol by verifying at least one validation condition based on at least one of the distance data, and the distance and position data.

40. The non-transitory computer-readable storage medium of claim 39, the at least one validation condition comprising one or more of:
the distance of the at least one command object is less than a predetermined selection distance,
the distance of the at least one command object is less than a predetermined selection distance during a predetermined minimum duration,
the at least one command object is in contact with a surface of the command interface,
the at least one command object performs a rapid to-and-fro movement over distance, and
at least two command objects perform a divergent movement in position around a predetermined position.

41. The non-transitory computer-readable storage medium of claim 33, the method further comprising selecting, while the command object hovers over the command interface, a particular command of the commands in the hierarchical levels of commands by verifying at least one selection condition based on at least one of the vertical distance data, and the vertical distance data and the horizontal position data, wherein the at least one selection condition comprises one or more of:
- the at least one command object performs a rapid to-and-fro movement over distance, and
- at least two command objects perform a convergent movement in position towards a predetermined position.

42. The non-transitory computer-readable storage medium of claim 33, the method further comprising displaying symbols in the form of icons.

43. The non-transitory computer-readable storage medium of claim 33, the method further comprising activating the display when the vertical distance data of the at least one command object is less than a predetermined activation distance.

44. The non-transitory computer-readable storage medium of claim 33, wherein the selecting the one set of commands comprises: in accordance with a determination that the vertical distance of said at least one command object is a third distance, different from and greater than the first distance and the second distance, from said command interface, selecting the one set of commands from the displayed plurality of sets of commands.

45. The non-transitory computer-readable storage medium of claim 44, wherein the third distance is less than a first threshold distance from said command interface but greater than or equal to a second threshold distance, smaller than the first threshold distance, from said command interface; and wherein a vertical distance of said at least one command object less than the first threshold distance but greater than or equal to the second threshold distance selects the one set of commands.

46. The non-transitory computer-readable storage medium of claim 45, wherein the first distance is less than the second threshold distance from said command interface but greater than or equal to a third threshold distance, smaller than the second threshold distance, from said command interface;
wherein a vertical distance of said at least one command object less than the second threshold distance but greater than or equal to the third threshold distance corresponds to the display of the first command; wherein the second distance is less than the third threshold distance from said command interface but greater than or equal to a fourth threshold distance, smaller than the third threshold distance, from said command interface; and wherein a vertical distance of said at least one command object less than the third threshold distance but greater than or equal to the fourth threshold distance corresponds to the display of the second command.

47. The non-transitory computer-readable storage medium of claim 46, wherein the first threshold distance is a predetermined distance and the second, third and fourth threshold distances are determined as functions of a number of commands or hierarchical levels of commands corresponding to the selected one set of commands.

48. The non-transitory computer-readable storage medium of claim 33, wherein the respective location on the display is the same as a location of the selected one set of commands, such that displaying the first command or the second command comprises superimposing the first command or the second command substantially over the selected set of commands.

49. The non-transitory computer-readable storage medium of claim 33, wherein the respective location on the display is different than, but proximate to, a location of the selected set of commands.

50. Non-transitory computer-readable storage medium of claim 33, wherein the browsing further includes navigating from the selected one set of commands to the first or second command based on horizontal position data.

51. The non-transitory computer-readable storage medium of claim 33, the method further comprising selecting a particular command of the commands in the hierarchical levels of commands by verifying at least one selection condition based on the vertical distance data, wherein the at least one selection condition further comprises one or more of:
- the distance of the at least one command object is less than a predetermined selection distance,
- the distance of the at least one command object is less than a predetermined selection distance during a predetermined minimum duration, and
- the at least one command object is in contact with the surface of the command interface.

* * * * *